United States Patent
Igarashi

(10) Patent No.: US 10,025,150 B2
(45) Date of Patent: Jul. 17, 2018

(54) LIQUID CRYSTAL DISPLAY

(71) Applicant: ORTUS TECHNOLOGY CO., LTD., Tokyo (JP)

(72) Inventor: Akira Igarashi, Hino (JP)

(73) Assignee: ORTUS TECHNOLOGY CO., LTD., Tokyo (JP)

( * ) Notice: Subject to any disclaimer, the term of this patent is extended or adjusted under 35 U.S.C. 154(b) by 65 days.

(21) Appl. No.: 14/644,780

(22) Filed: Mar. 11, 2015

(65) Prior Publication Data

US 2015/0185518 A1 Jul. 2, 2015

Related U.S. Application Data

(63) Continuation of application No. PCT/JP2014/050841, filed on Jan. 17, 2014.

(30) Foreign Application Priority Data

Feb. 4, 2013 (JP) .................................. 2013-019689

(51) Int. Cl.
G02F 1/1347 (2006.01)
G02F 1/1334 (2006.01)
(Continued)

(52) U.S. Cl.
CPC .......... *G02F 1/1347* (2013.01); *G02F 1/1334* (2013.01); *G02F 1/1339* (2013.01);
(Continued)

(58) Field of Classification Search
CPC .. G02F 1/1347; G02F 1/1334; G02F 1/13306; G02F 1/1339; G02F 1/13338;
(Continued)

(56) References Cited

U.S. PATENT DOCUMENTS 5,264,952 A * 11/1993 Fukutani ........... G02F 1/133514
349/106
5,296,952 A 3/1994 Takatsu et al.
(Continued)

FOREIGN PATENT DOCUMENTS

CN 1892337 A 1/2007
CN 101946271 * 1/2011 ............. G02B 1/118
(Continued)

OTHER PUBLICATIONS

Extended European Search Report dated Jun. 17, 2016 in corresponding European Patent Application No. 14745937.4.
(Continued)

*Primary Examiner* — Charles Chang

(57) ABSTRACT

A liquid crystal display includes first and second liquid crystal panels, an air layer and a seal member. The first liquid crystal panel comprises first and second substrates which are disposed opposite each other, and a first liquid crystal layer of a polymer dispersed type sandwiched between the first and second substrates. The second liquid crystal panel comprises third and fourth substrates which are disposed opposite each other, a second liquid crystal layer sandwiched between the third and fourth substrates, a color filter provided on the third substrate, and first and second polarizing plates provided on the third and fourth substrates, respectively. The air layer is sandwiched between the first and second liquid crystal panels and in contact with the second and third substrates. The seal member seals the air layer between the second and third substrates.

12 Claims, 9 Drawing Sheets

(51) Int. Cl.
*G02F 1/133* (2006.01)
*G02F 1/1333* (2006.01)
*G02F 1/1335* (2006.01)
*G02F 1/1339* (2006.01)

(52) U.S. Cl.
CPC ...... *G02F 1/13306* (2013.01); *G02F 1/13338* (2013.01); *G02F 1/13476* (2013.01); *G02F 1/133514* (2013.01); *G02F 1/133528* (2013.01); *G02F 1/133553* (2013.01)

(58) Field of Classification Search
CPC ......... G02F 1/133514; G02F 1/133528; G02F 1/13476; G02F 1/133553
See application file for complete search history.

(56) References Cited

U.S. PATENT DOCUMENTS

| | | | | |
|---|---|---|---|---|
| 6,317,178 | B1 * | 11/2001 | Brandt | G02F 1/133382 349/147 |
| 6,707,515 | B1 * | 3/2004 | Ide | G02F 1/133536 349/74 |
| 8,228,306 | B2 * | 7/2012 | Long | G06F 3/0412 178/18.01 |
| 8,471,998 | B2 * | 6/2013 | Ishii | G02F 1/009 349/182 |
| 2006/0033865 | A1 | 2/2006 | Tanaka et al. | |
| 2006/0073851 | A1 | 4/2006 | Colando et al. | |
| 2011/0001912 | A1 | 1/2011 | Ninomiya et al. | |
| 2011/0063490 | A1 | 3/2011 | Ogita | |

FOREIGN PATENT DOCUMENTS

| | | | | |
|---|---|---|---|---|
| CN | 101946271 A | | 1/2011 | |
| EP | 0516076 A2 | | 12/1992 | |
| EP | 2249330 A1 | | 11/2010 | |
| JP | 5-273576 | | 10/1993 | |
| JP | 11-160682 | | 6/1999 | |
| JP | 2000-214277 | | 8/2000 | |
| JP | 2006-101505 | | 4/2006 | |
| JP | 2007-298844 | | 11/2007 | |
| JP | 2007-323882 | | 12/2007 | |
| JP | 2010-211084 | * | 9/2010 | ............... G02F 1/13 |
| KR | 2001-0013835 | | 2/2001 | |
| KR | 10-2005-0069994 | | 7/2005 | |
| KR | 10-0758986 | | 9/2007 | |

OTHER PUBLICATIONS

Korean Notice of Allowance dated Jun. 22, 2016 in corresponding Korean Patent Application No. 10-2015-7006380.
Korean Office Action dated Feb. 19, 2016 in corresponding Korean Patent Application No. 10-2015-7006380.
International Search Report dated Apr. 8, 2014 for corresponding International Patent Application No. PCT/JP2014/050841.
English Translation of International Preliminary Report on Patentability for International Patent Application No. PCT/JP2014/050841.
Chinese Office Action dated Sep. 1, 2016 in corresponding Chinese Patent Application No. 201480002343.X.
Chinese Office Action dated Mar. 22, 2017, in corresponding Chinese Patent Application No. 201480002343.X.
Chinese Office Action dated Aug. 28, 2017 in corresponding Chinese Patent Application No. 201480002343.
European Office Action dated May 22, 2017 in corresponding European Patent Application No. 14745937.4.

* cited by examiner

Character display

Information display

Character display

Information display

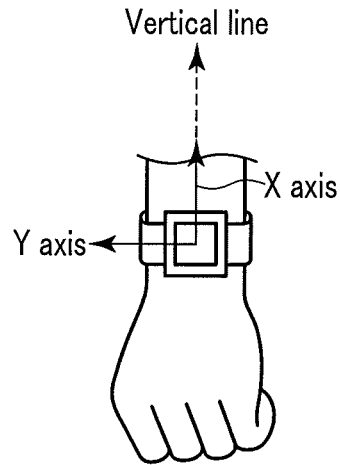
State where user is not viewing display ($\theta \fallingdotseq 90°, \phi \fallingdotseq 0°$)
F I G. 8A
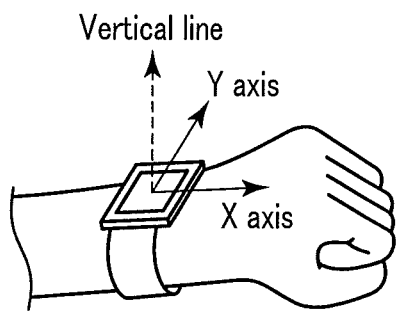
State where user is viewing display ($\theta \fallingdotseq 80, \phi \fallingdotseq 90$)
F I G. 8B

LIQUID CRYSTAL DISPLAY

CROSS-REFERENCE TO RELATED APPLICATIONS

This application is a Continuation application of PCT Application No. PCT/JP2014/050841, filed Jan. 17, 2014, and based upon and claiming the benefit of priority from Japanese Patent Application No. 2013-019689, filed Feb. 4, 2013, the entire contents of all of which are incorporated herein by reference.

BACKGROUND OF THE INVENTION

1. Field of the Invention

The present invention relates to a liquid crystal display.

2. Description of the Related Art

Watches have primarily been used for character display such as time display, and thus have used a liquid crystal display which can display characters and which consumes lower power, for example, a reflective or semi-transmissive liquid crystal display. On the other hand, smartphones are now used as small portable information terminals. Such portable information terminals use a transmissive color liquid crystal display, an organic EL display, or the like.

For a watch worn around a user's wrist for use, a mountable battery has only a small capacity. Hence, when the transmissive color liquid crystal display or the organic EL display is used for the watch in order to allow the watch to implement display with a large amount of information which is handled by the portable information terminal, power consumption increases, and thus, this is unpractical.

BRIEF SUMMARY OF THE INVENTION

According to an aspect of the present invention, there is provided a liquid crystal display comprising:

a first liquid crystal panel comprising first and second substrates which are disposed opposite each other, and a first liquid crystal layer of a polymer dispersed type or a polymer network type sandwiched between the first and second substrates;

a second liquid crystal panel comprising third and fourth substrates which are disposed opposite each other, a second liquid crystal layer sandwiched between the third and fourth substrates, a color filter provided on the third substrate, and first and second polarizing plates provided on the third and fourth substrates, respectively; and a transparent member sandwiched between the first and second liquid crystal panels and in contact with the second substrate, the transparent member having a refractive index different from a refractive index of the second substrate.

BRIEF DESCRIPTION OF THE SEVERAL VIEWS OF THE DRAWING

FIG. 8A is a diagram illustrating that a user wears the electronic watch.

FIG. 8B is a diagram illustrating that the user wears the electronic watch.

DETAILED DESCRIPTION OF THE INVENTION

Figure 1:
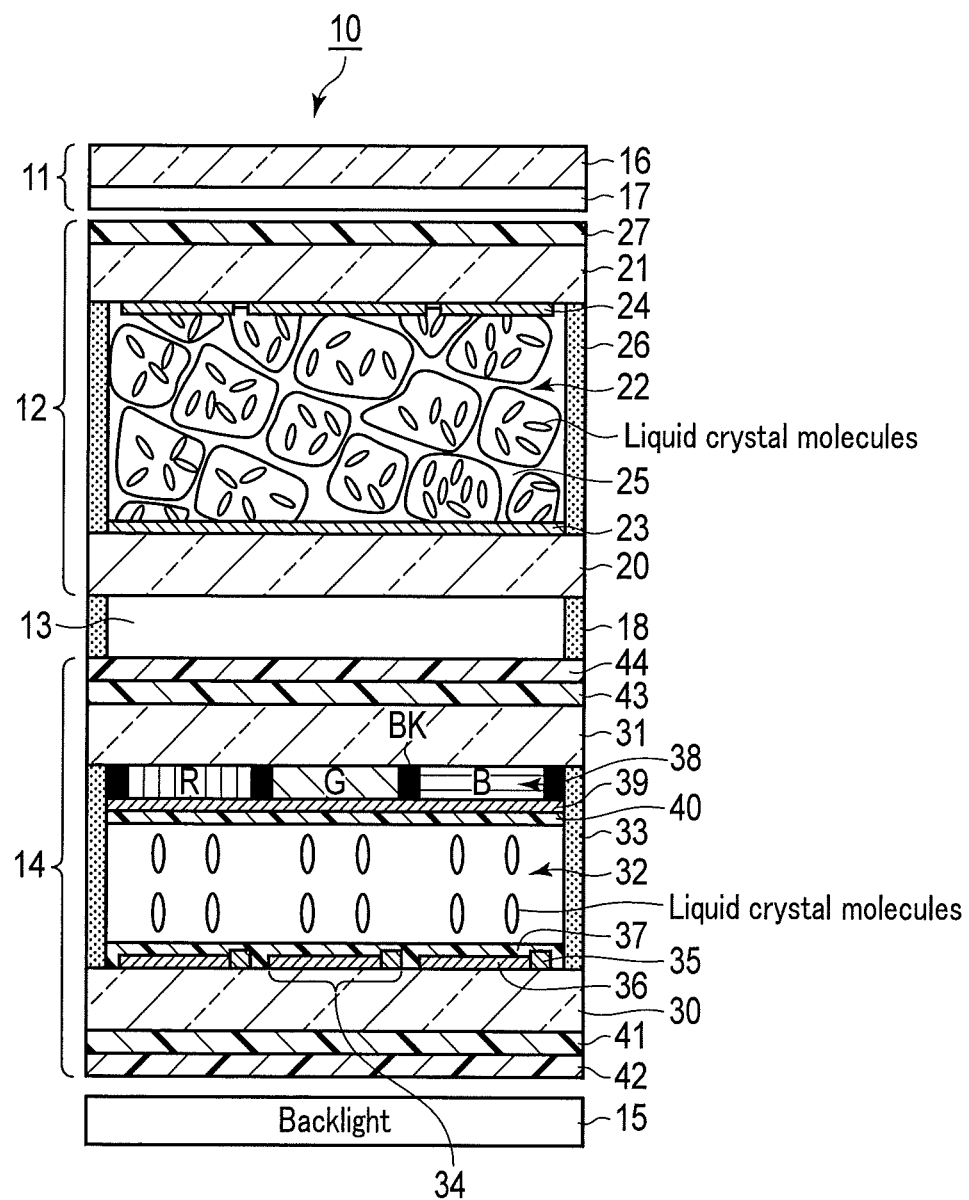
FIG. 1 is a cross-sectional view of a liquid crystal display unit according to the present embodiment.

The embodiments of the present invention will be described below with reference to the accompanying drawings. Note that the drawings are schematic and conceptual, and the dimensions, ratios, and the like in the respective drawings are not necessary the same as those in reality. In addition, even the same portion may be shown in a different dimensional relationship or with different ratios in different drawings. Several embodiments to be described below represent examples of apparatuses and methods for embodying the technical idea of the present invention, and the technical idea of the present invention is not specified by the shapes, structures, and layouts of the constituent parts. The technical idea of the present invention can be embodied by modifying constituent elements without departing from the gist of the invention. Note that in the following explanation, the same reference numerals denote elements having the same functions and arrangements, and a repetitive explanation will be made only when necessary.

First Embodiment

[1. Configuration of the Liquid Crystal Display Unit 10]

A liquid crystal display unit 10 according to the present embodiment is a liquid crystal panel used for, for example, an electronic watch. FIG. 1 is a cross-sectional view of the liquid crystal display unit 10 according to the present embodiment. The liquid crystal display unit 10 comprises a first liquid crystal panel 12 and a second liquid crystal panel 14. The first liquid crystal panel 12 and the second liquid crystal panel 14 are laminated via a transparent member (for example, an air layer) 13.

The first liquid crystal panel 12 absorbs a substantially reduced amount of light from the liquid crystal panel itself to provide a bright screen and provide a lower portion of the panel with high visibility. The first liquid crystal panel 12 can also be driven with reduced amount of power. Furthermore, the first liquid crystal panel 12 is of a pattern display type that performs character display with a small amount of information and graphic display with a small amount of information (hereinafter referred to as character display) and can display a transparent state and a scattering state, that is, can perform black and white display. The character display includes display of characters and graphics with a small amount of information, and time display (segment display). The first liquid crystal panel 12 comprises a liquid crystal panel selected from, for example, a polymer dispersed liquid crystal (PDLC) or a polymer network liquid crystal (PNLC).

The second liquid crystal panel 14 performs the character display with a large amount of information and image display (hereinafter referred to as information display) and can provide color display. The second liquid crystal panel 14 comprises a liquid crystal panel with a color filter. In the liquid crystal display unit 10 in the present embodiment, the first liquid crystal panel 12 performs the character display (including time display and standby display), and the second liquid crystal panel 14 performs the information display, which involves a larger amount of information than the character display.

First, the structure of the first liquid crystal panel 12 will be described. The first liquid crystal panel 12 comprises a lower substrate 20 on which a common electrode is formed, an upper substrate 21 on which a display electrode is formed and which is disposed opposite the lower substrate 20, and a liquid crystal layer 22 sandwiched between the lower substrate 20 and the upper substrate 21. A surface of the upper substrate 21 opposite to the liquid crystal layer 22 corresponds to a display surface of the liquid crystal display unit 10. The lower substrate 20 and the upper substrate 21 each comprise a transparent substrate (for example, a glass substrate).

A common electrode 23 is provided on the lower substrate 20. The common electrode 23 is formed all over the display surface and has a planar shape. A plurality of display electrodes 24 is provided on the upper substrate 21. The plurality of display electrodes 24 is processed to have shapes corresponding to characters that can be displayed on the first liquid crystal panel 12. FIG. 1 illustrates only three display electrodes 24 for simplification. However, in actuality, more display electrodes 24 are provided to perform the character display. The common electrode 23 and the display electrode 24 are each formed of a transparent conducive film of an ITO (Indium Tin Oxide) or the like. An UV (Ultraviolet) cut film 27 is provided on a front surface side of the upper substrate 21. The disposition of the common electrode 23 and the disposition of the display electrodes 24 may be reversed.

The liquid crystal layer 22 is sealed by a seal member 26 that is used for bonding the lower substrate 20 and the upper substrate 21. The liquid crystal layer 22 is formed of a polymer dispersed liquid crystal (PDLC) or a polymer network liquid crystal (PNLC) as described above. The PNLC has a structure in which a liquid crystal material is dispersed in a polymer network 25, and the liquid crystal material in the polymer network 25 has a continuous phase. The PDLC has a structure in which the polymer disperses the liquid crystals, that is, the liquid crystals are subjected to phase separation in the polymer. A photocurable resin may be used as a polymer layer. For example, for the PNLC, ultraviolet light is radiated to a solution containing photo-polymerized polymer precursors (monomers) mixed with liquid crystal materials to polymerize the monomers so that the liquid crystal material is dispersed in the network of the resultant polymer. As the liquid crystal material for the liquid crystal layer 22, positive (P-type) nematic liquid crystals are used. That is, long axes (directors) of liquid crystal molecules are randomly oriented at the time of no voltage (no electric field) and oriented substantially perpendicularly to a substrate surface at the time of voltage application (electric field application).

Next, the structure of the second liquid crystal panel 14 will be described. The second liquid crystal panel 14 uses an active matrix scheme in which an active element is disposed for each pixel.

The second liquid crystal panel 14 comprises a TFT substrate 30 on which TFTs (Thin Film Transistors) serving as active elements (switching elements), pixel electrodes, and the like are formed, a color filter substrate (CF substrate) 31 disposed opposite the TFT substrate 30, and a liquid crystal layer 32 sandwiched between the TFT substrate 30 and the CF substrate 31. The TFT substrate 30 and the CF substrate 31 each comprise a transparent substrate (for example, a glass substrate).

The liquid crystal layer 32 is formed of a liquid crystal material sealed by a seal member 33 that is used for bonding the TFT substrate 30 and the CF substrate 31. The liquid crystal material has its optical characteristics changed by controlling the orientation of liquid crystal molecules in association with an electric field generated between the TFT substrate 30 and the CF substrate 31. The second liquid crystal panel 14 in the present embodiment uses a vertical alignment (VA) mode using, for example, vertical alignment (VA) liquid crystals. That is, negative (N-type) nematic liquid crystals are used as the liquid crystal layer 32. The liquid crystal molecules are oriented substantially perpendicularly to the substrate surface at the time of no voltage (no electric field). In the arrangement of the liquid crystal molecules in the VA mode, the long axes (directors) of the liquid crystal molecules are vertically oriented at the time of no voltage and tilted toward a horizontal direction at the time of voltage application (electric field application). As liquid crystal modes other than the VA mode, a homogeneous mode or a twisted nematic (TN) mode may be used. The VA mode is more suitable in view of improvement of contrast.

On the TFT substrate 30, TFTs 35 and pixel electrodes 36 are provided for respective pixels 34. Furthermore, on the TFT substrate 30, an orientation film 37 is provided so as to cover the TFTs 35 and the pixel electrodes 36. A display pixel comprises three subpixels with respective color filters in red (R), green (G), and blue (B). The subpixel is hereinafter referred to as the pixel unless the display pixel and the subpixel need to be distinguished from each other. The TFT 35 is a switching element formed on a liquid crystal layer 32 side of the TFT substrate 30 to switch the pixel 34 on and off. FIG. 1 depicts only three pixels for simplification. However, in actuality, more pixels 34 are provided in order to perform the information display.

The pixel electrode 36 is provided for each of the pixels 34 and formed all over the corresponding pixel 34. The pixel electrode 36 is intended to apply a voltage to the liquid crystal layer 32 and electrically connected to an end of a current path in the TFT 35. The pixel electrode 36 is formed of a transparent conductive film of ITO (Indium Tin Oxide) or the like. The orientation film 37 controls the orientation of the liquid crystal molecules.

A color filter 38, a common electrode 39, and an orientation film 40 are provided on the CF substrate 31. The color filter 38 is provided on a liquid crystal layer 32 side of the CF substrate 31 and comprises color filters in three colors (coloring members) including a red filter R, a green filter G, and a blue filter B. The red filter R, the green filter G, and the blue filter B are disposed at positions opposite to the pixel electrodes 36 to provide subpixels. A light-shielding film (black matrix) BK is formed between the red filter R and the green filter G and the blue filter B in order to prevent color mixture.

The common electrode 39 is provided on a liquid crystal layer 32 side of the color filter 38. The common electrode 39 is formed all over the display surface and has a planar shape. The common electrode 39 is formed of a transparent conductive film of an ITO or the like. The orientation film 40 is paired with the orientation film 37 to control the orientation of the liquid crystal molecules. In the present embodiment, the orientation films 37 and 40 orient the liquid crystal molecules substantially perpendicularly to the substrate surface when no potential difference is present between the pixel electrode 36 and the common electrode 39, in other words, when no electric field is generated between the pixel electrode 36 and the common electrode 39.

A phase plate (retardation plate) 41 and a polarizing plate 42 are provided on a backlight 15 side of the TFT substrate 30. A phase plate 43 (retardation plate) and a polarizing plate 44 are provided on a display surface side of the CF substrate 31. The polarizing plates 42 and 44 transmit light with a plane of vibration extending in a direction parallel to the a transmission axis, that is, light in a polarized state of linear polarization, from light with planes of vibration extending in random directions. Each of the polarizing plates 42 and 44 has an absorption axis and a transmission axis that are orthogonal to each other in a plane. The polarizing plates 42 and 44 are disposed such that the transmission axes thereof are orthogonal to each other.

Each of the phase plates 41 and 43 has refractive index anisotropy and has a slow axis and a fast axis which are orthogonal to each other in a plane. The phase plates 41 and 43 are disposed such that the lag axes thereof are orthogonal to each other. The phase plates 41 and 43 have a function to provide retardation (a phase difference of λ/4 when the wavelength of transmitted light is denoted by λ) between light with a predetermined wavelength transmitted through the slow axis and light with a predetermined wavelength transmitted through the fast axis. That is, each of the phase plates 41 and 43 comprises a λ/4 plate. The slow axis of each of the phase plates 41 and 43 is set at approximately 45° to the transmission axis of each of the polarizing plates 42 and 44.

The first liquid crystal panel 12 and the second liquid crystal panel 14 are laminated via a transparent member 13. The transparent member 13 contacts a lower substrate 20 of the first liquid crystal panel 12. The refractive index of the transparent member 13 is set different from the refractive index of the lower substrate 20. The transparent member 13 may be any transparent member that meets the above-described conditions and may further be gas or liquid. In the present embodiment, the transparent member 13 is formed of, for example, an air layer (air space). The air layer that is an example of the transparent member 13 is represented as an air layer 13a. The use of the air layer 13a as the transparent member 13 is preferable in terms of costs. The air layer 13a is sealed between the first liquid crystal panel 12 and the second liquid crystal panel 14 by a seal member 18. The air layer 13a provided between the first liquid crystal panel 12 and the second liquid crystal panel 14 causes light entering the first liquid crystal panel 12 from a front surface side to be reflected by an interface between the lower substrate 20 and the air layer 13a. As a result, the first liquid crystal panel 12 enables bright display to be provided.

In a plane opposite to the display surface of the liquid crystal display unit 10, the backlight (light source) 15 is disposed opposite the liquid crystal display unit 10. For example, an EL (Electroluminescence) backlight is used as the backlight 15.

A touch panel 11 is provided on a display surface side of the first liquid crystal panel 12. The touch panel 11 comprises a transparent substrate (for example, a glass substrate) 16 and a touch sensor 17. The touch panel 11 detects that a user has depressed the panel and further identifies a depressed position, in other words, the coordinates of the touch position. The touch panel 11 may be based on any of the following: a resistive film scheme, an electrostatic capacity scheme, an electromagnetic induction scheme, an ultrasonic surface acoustic wave scheme, and an infrared scan scheme.

[2. Configuration of the Liquid Crystal Display (Electronic Watch) 50]

Figure 2A:
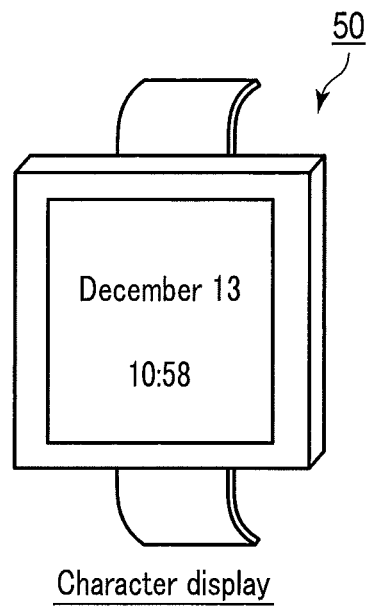
FIG. 2A is a schematic diagram of an electronic watch.
Figure 2B:
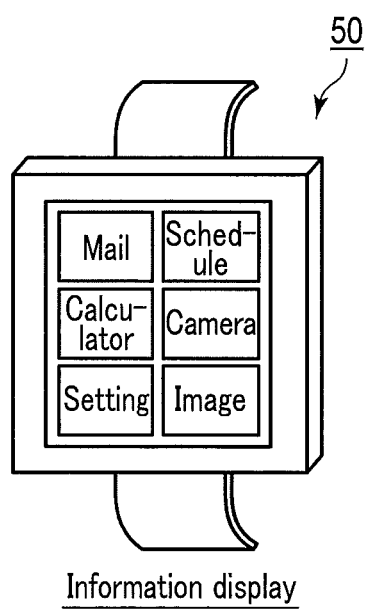
FIG. 2B is a schematic diagram of the electronic watch.

Next, a configuration of a liquid crystal display 50 with a liquid crystal display unit 10 depicted in FIG. 1 will be described below. An electronic watch will be described as an example of the liquid crystal display 50. FIGS. 2A and 2B are schematic diagrams of the electronic watch 50. FIG. 2A depicts an example of the character display provided by the first liquid crystal panel 12. FIG. 2B depicts an example of the information display provided by the second liquid crystal panel 14.

Figure 3:
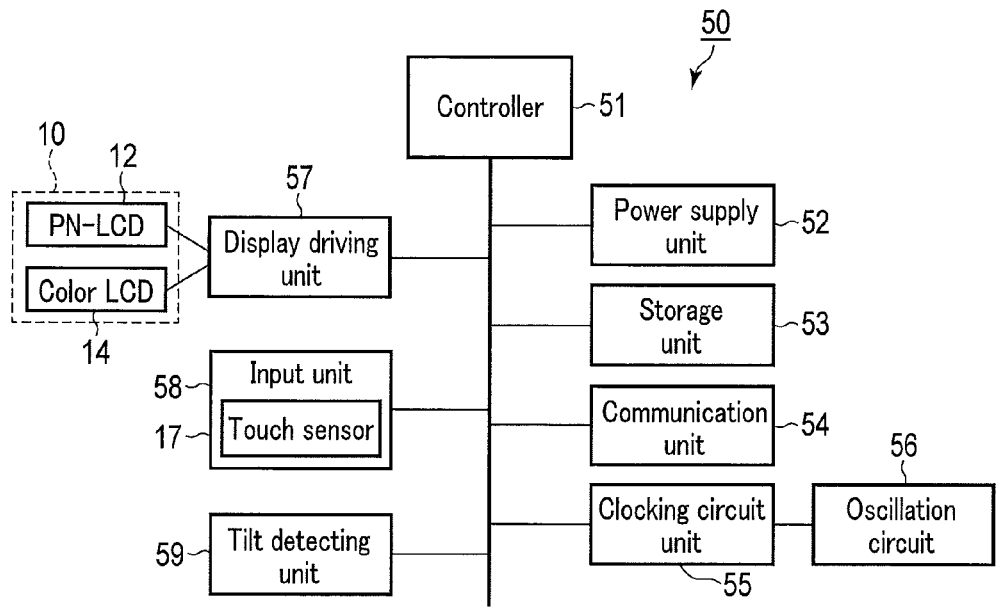
FIG. 3 is a block diagram of the electronic watch.

FIG. 3 is a block diagram of the electronic watch 50. The electronic watch 50 comprises a controller 51, a power supply unit 52, a storage unit 53, a communication unit 54, a clocking circuit unit 55, an oscillation circuit 56, a display driving unit 57, a liquid crystal display unit 10, an input unit 58, and a tilt detecting unit 59.

The power supply unit 52 provides various power supplies to modules in the electronic watch 50 via power supply lines. The power supply unit 52 comprises, for example, a button battery (primary battery).

The storage unit 53 comprises, for example, a ROM (Read Only Memory) for data read, and a data readable and writable RAM (Random Access Memory). The storage unit 53 includes a system program for allowing various functions of the electronic watch 50 to be implemented, a program area in which application programs and the like are stored, and a data area in which various data such as image data are stored.

The communication unit 54 controls communication (wireless communication) with other apparatuses via a network including the Internet. Furthermore, the communication unit 54 may have a function to control short-range wireless communication such as Bluetooth (registered trademark) which is made with other apparatuses.

The oscillation circuit 56 constantly outputs a clock signal with a constant frequency. The clocking circuit unit 55 counts signals received from the oscillation circuit 56 to acquire the current time data and the like. The clocking circuit unit 55 outputs the acquired current time data and date data to the controller 51.

The display driving unit 57 drives the liquid crystal display unit 10 based on control signals, data, and the like from the controller 51 to allow the liquid crystal display unit 10 to display various characters and various types of information. Furthermore, the display driving unit 57 individually drives the first liquid crystal panel (PD-LCD or PN-LCD) 12 and second liquid crystal panel (color LCD) 14, which are included in the liquid crystal display unit 10.

The input unit 58 includes a plurality of pushbuttons used to give instructions to execute various functions of the electronic watch 50, and the touch sensor 17 depicted in FIG. 1. When the user operates the input unit 58, time setting, mode selection, or the like is executed based on the operation.

The tilt detecting unit 59 detects a tilt of the display surface of the electronic watch 50. Specifically, the tilt detecting unit 59 detects the angle between the display surface of the electronic watch 50 and a vertical line (direction of gravity). The tilt detecting unit 59 comprises, for example, a three-axis acceleration sensor.

The controller 51 controls the general operation of the electronic watch 50. The controller 51 comprises a CPU (Central Processing Unit). The controller 51, for example, reads any of various programs stored in a ROM at a predetermined timing or in accordance with an operation signal or the like input via the input unit 58 and loads the program into a work area of a RAM. The controller 51 then instructs (controls) modules of the electronic watch 50, transfers data, or performs any other operation in accordance with the program.

Furthermore, although not depicted in the drawings, the electronic watch 50 comprises a camera function (imaging unit).

[3. Operations of the Liquid Crystal Display Unit 10]

Figure 4:
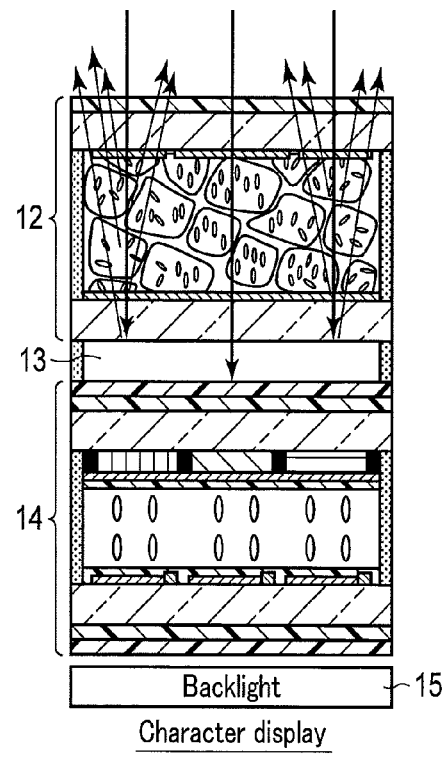
FIG. 4 is a diagram illustrating operations of the liquid crystal display unit for character display.

Next, operations of the liquid crystal display unit 10 comprising the first liquid crystal panel 12 and the second liquid crystal panel 14 will be described. As described above, the operations of the liquid crystal display unit 10 are controlled by the display driving unit 57 and the controller 51. Furthermore, an operation for the character display will be described. FIG. 4 is a diagram illustrating an operation of the liquid crystal display unit 10 in the character display.

In the character display, the first liquid crystal panel 12 performs a display operation, while the second liquid crystal panel 14 is in an off state (the backlight 15 is also off). The second liquid crystal panel 14 is based on a normally black mode and provides black display in the off state.

In the liquid crystal layer 22 in the first liquid crystal panel 12, the liquid crystals are dispersed in the polymer network, and the liquid crystal molecules are randomly arranged at the time of voltage off (no electric field). When the refractive index of extraordinary light from liquid crystal molecules is denoted by $n_e$ and the refractive index of ordinary light from liquid crystal molecules is denoted by $n_o$, "$n_e > n_o$". When the refractive index of the polymer network is denoted by n, "$n = n_o$" is set. In an area in the off state, when light enters the first liquid crystal panel 12 from the display surface side, the light scatters to provide white display because the liquid crystals are randomly arranged. At this time, since the air layer 13a, which has a refractive index different from the refractive index of the lower substrate 20, is present under the lower substrate 20, light having reached the lower substrate 20 is reflected by the interface between the lower substrate 20 and the air layer 13a. As a result, the first liquid crystal panel 12 allows bright display to be achieved.

On the other hand, when a voltage (electric field) is applied to the liquid crystal layer 22 (on state), the long axes (directors) of the liquid crystals are arranged in the direction of the electric field, and the refractive index of the liquid crystal layer 22 has a uniform value n. In this area in the on state, light having entered the first liquid crystal panel 12 from the display surface side transmits straight through the liquid crystal layer 22. In this case, light having transmitted through the liquid crystal layer 22 reaches the polarizing plate 44 of the second liquid crystal panel 14 but is then not reflected and provides black display.

Thus, individual control of the voltages of the plurality of display electrodes 24 allows control of areas in the off state and areas in the on state. An area in which the display electrode 24 is in the off state provides white display. An area in which the display electrode 24 is in the on state provides black display. Thus, any character display (in the present embodiment, time display and standby display) can be implemented.

Figure 5:
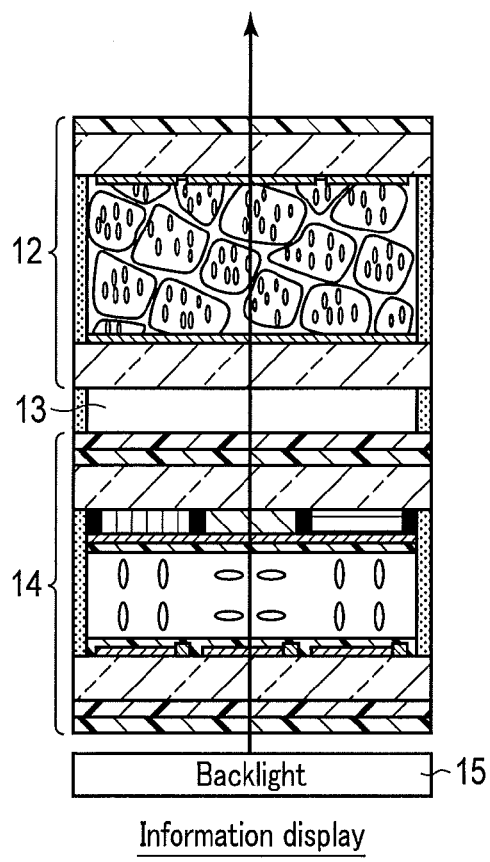
FIG. 5 is a diagram illustrating operations of the liquid crystal display unit for information display.

Next, an operation for the information display will be described. FIG. 5 is a diagram illustrating an operation of the liquid crystal display unit 10 in the information display.

In the information display, the backlight 15 is turned on, light from the backlight 15 enters the second liquid crystal panel 14. Moreover, the second liquid crystal panel 14 is driven, and the entire display surface of the first liquid crystal panel 12 is set to a transmissive state (transparent state). That is, the liquid crystal layer 22 in the first liquid crystal panel 12 is entirely set to the on state.

In pixels in the off state in the second liquid crystal panel 14, the long axes of the liquid crystal molecules stand upright. Thus, the phase difference in the liquid crystal layer 32 is approximately zero. Hence, in the off state, backlight light having transmitted through the polarizing plate 42 is transmitted through the liquid crystal layer 32 with approximately zero phase difference and absorbed by the polarizing plate 44 disposed in a crossed Nichol state with respect to the polarizing plate 42 to provide black display. The black display on the second liquid crystal panel 14 is viewed by the user via the first liquid crystal panel 12 in the transmissive state.

On the other hand, in pixels in the on state in the second liquid crystal panel 14, the long axes of the liquid crystal molecules are tilted from the vertical direction. The phase difference in the liquid crystal layer 32 in this case is set approximately to $\lambda/2$. Hence, in the on state, backlight light having transmitted through the polarizing plate 42 is transmitted through the liquid crystal layer 32 and provided with a phase difference. The backlight light then transmits through the polarizing plate 44 to provide white display (color display). The color display on the second liquid crystal panel 14 is viewed by the user via the first liquid crystal panel 12 in the transmissive state.

[4. Operations of the Electronic Watch 50]

Figure 6:
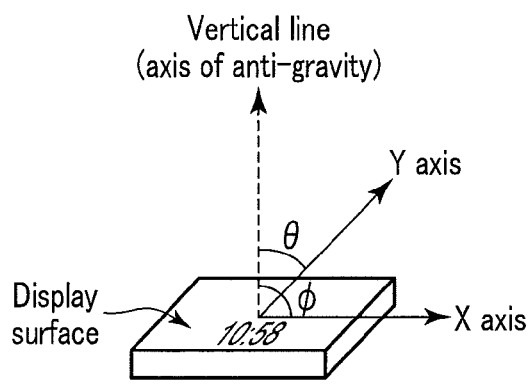
FIG. 6 is a diagram illustrating a detecting operation of a tilt detecting unit.

Next, operations of the electronic watch 50 will be described. First, operations of the tilt detecting unit 59 will be described. FIG. 6 illustrates a detecting operation of the tilt detecting unit 59.

A direction in which character strings are arranged in the display surface of the electronic watch 50 is defined as an X axis. A direction orthogonal to the X axis is defined as a Y axis. Furthermore, the angle between the X axis and the vertical line (the axis of anti-gravity) is defined as $\phi$. The angle between the Y axis and the vertical line is defined as $\theta$. The tilt detecting unit 59 determines how the X axis is inclined to the vertical line (what degree the angle $\phi$ is) and how the Y axis is inclined to the vertical line (what degree the angle $\theta$ is). It is assumed that "$0° \leq \phi \leq 90°$" and "$0° \leq \theta \leq 90°$". That is, the angles $\phi$ and $\theta$ are each a smaller angle to the vertical line.

Figure 7:
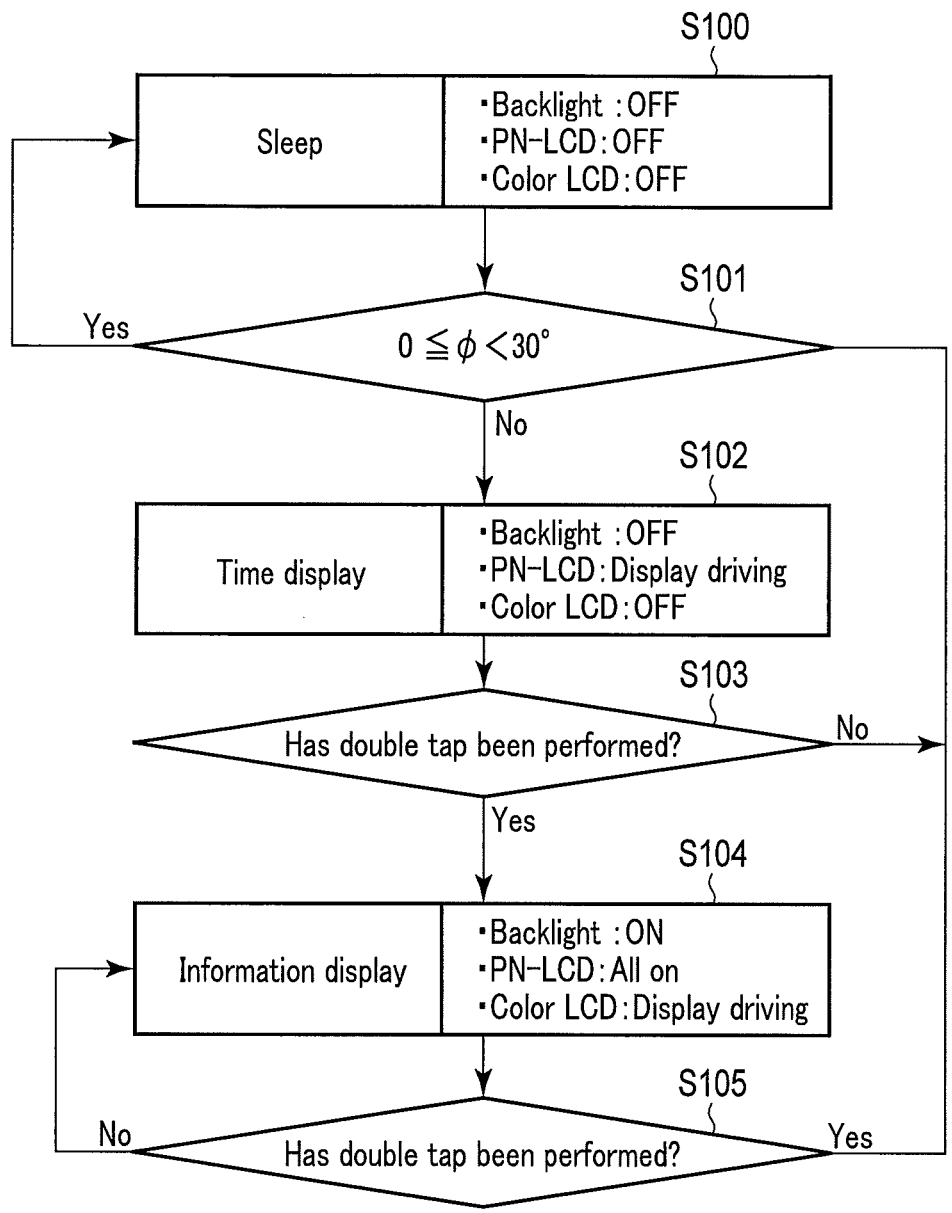
FIG. 7 is a flowchart depicting operations of the electronic watch.

FIG. 7 is a flowchart illustrating operations of the electronic watch 50. It is assumed that the electronic watch 50 is worn around the user's wrist. The controller 51 monitors detection results from the tilt detecting unit 59 (step S101). When the angle $\phi$ is "$0° \leq \phi < 30°$", the controller 51 sets the electronic watch 50 to a sleep mode (power saving mode) (step S100). The condition "$0° \leq \phi < 30°$" is intended to detect that the user is not viewing the display on the electronic watch 50. FIG. 8A is a diagram illustrating that the user is not viewing the display on the electronic watch 50. The user holds the user's arm wearing the electronic watch 50, substantially along the vertical line. In this case, for example, "$\theta \approx 90°$ and $\phi \approx 0°$". "$\approx$" means approximation. In the sleep mode, the controller 51 turns all of the following off: the backlight 15, the first liquid crystal panel 12 (PD-LCD or PN-LCD), and the second liquid crystal panel (color LCD) 14. Thus, in the sleep mode, the power consumption f the electronic watch 50 can be reduced.

In step S101, upon determining that the angle $\phi$ is at least 30°, the controller 51 sets the electronic watch 50 to a time display mode (step S102). The condition "$\phi \geq 30°$" is intended to detect that the user is viewing the display on the electronic watch 50. The angle $\phi = 30°$ intended to determine whether the electronic watch 50 has been switched to the sleep mode or to the time display mode is illustrative and can be designed to be optimum in accordance with the specification of the electronic watch 50. FIG. 8B is a diagram illustrating that the user is viewing the display on the electronic watch 50. The user holds the user's arm wearing the electronic watch 50, substantially in the horizontal direction. In this case, for example, "θ≈80° and φ≈90°". In the time display mode, the controller 51 turns the backlight 15 off, performs display driving on the first liquid crystal panel (PD-LCD or PN-LCD) 12, and turns the second liquid crystal panel (color LCD) 14 off. Thus, the user can view the time display as an example of the character display. In the time display mode, the backlight 15 and the second liquid crystal panel (color LCD) 14 are off, allowing the power consumption of the electronic watch to be suppressed.

Subsequently, the controller 51 monitors a detection result from the touch panel 11 (step S103). When the touch panel 11 detects a switching operation by the user, for example, a double tapping operation on the touch panel 11, the controller 51 sets the electronic watch 50 to an information display mode (step S104). In the information display mode, the controller 51 turns the backlight 15 on, turns the entire display surface of the first liquid crystal panel (PD-LCD or PN-LCD) 12 on (transmissive state), and performs display driving on the second liquid crystal panel (color LCD) 14. In the information display mode, the electronic watch 50 displays information the amount of which is larger than in the character display and can perform color display.

Subsequently, the controller 51 monitors a detection result from the touch panel 11 (step S105). When the touch panel 11 detects a double tapping operation on the touch panel 11, the controller 51 returns to step S101 to monitor a detection result from the tilt detecting unit 59.

Figure 9:
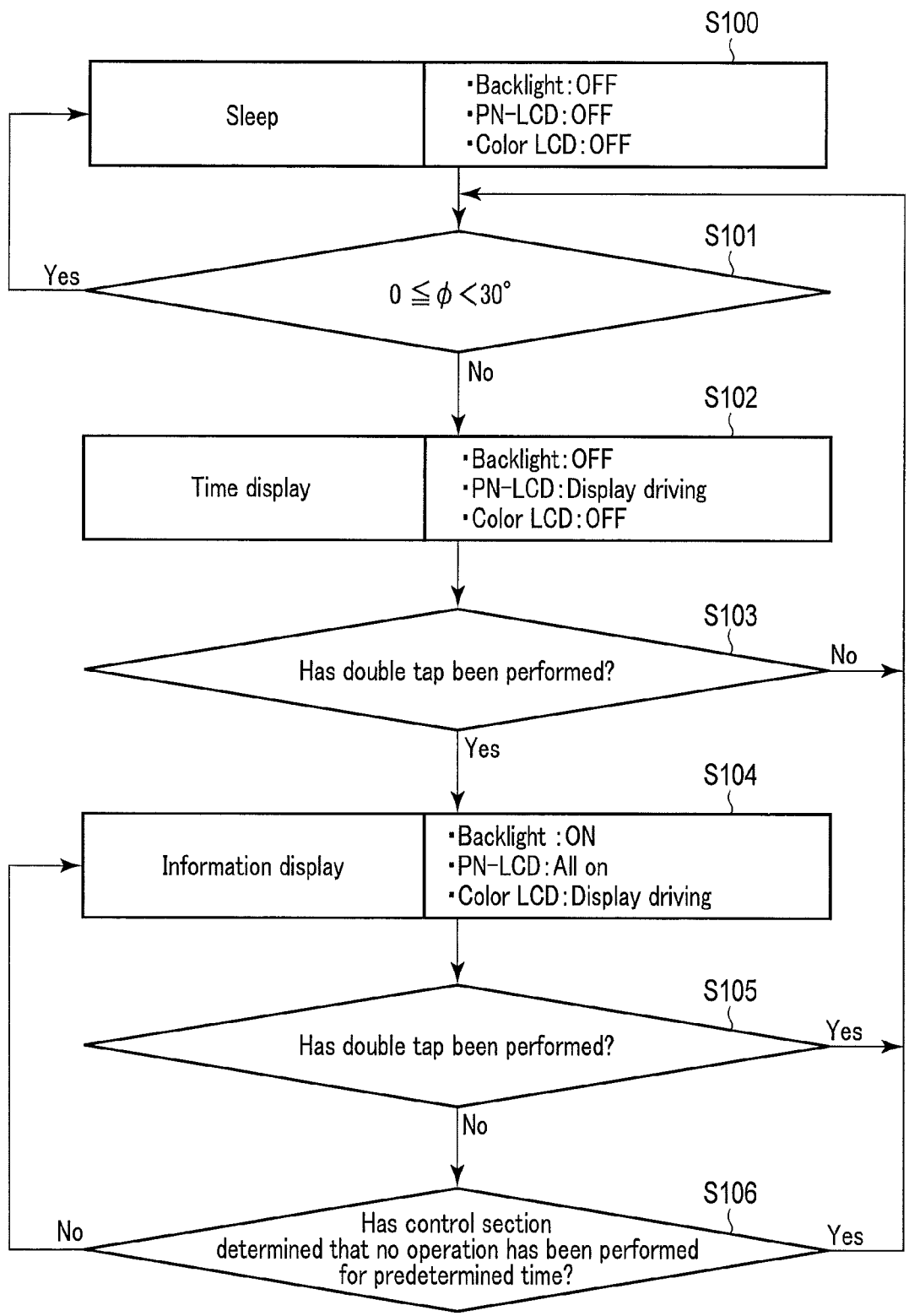
FIG. 9 is a flowchart depicting operations of an electronic watch according to a modification.

FIG. 9 is a flowchart depicting operations of the electronic watch 50 according to a modification. Subsequently to step S105, the controller 51 determines, for a predetermined time, whether or not the user has performed an input operation via the input unit 58 (step S106). Upon determining in step S106 that the user has performed no input operation for the predetermined time, the controller 51 returns to step S101 to monitor a detection result from the tilt detecting unit 59. The addition of step S106 allows the user to shift the electronic watch 50 to the sleep mode even when forgetting to turn the information display mode off after the use of the information display mode. This enables prevention of a wasteful increase in the power consumption of the electronic watch 50.

Figure 10:
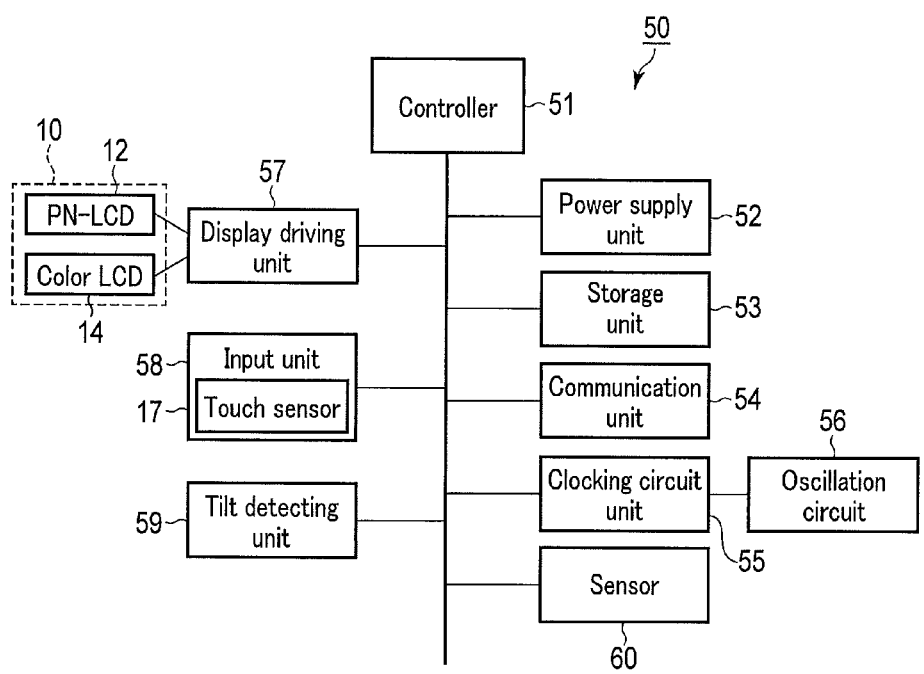
FIG. 10 is a block diagram of the electronic watch according to the modification.

Furthermore, when not worn around the user's wrist, the electronic watch 50 is set to the sleep mode. FIG. 10 is a block diagram of the electronic watch 50 according to a modification. For example, the electronic watch 50 comprises a sensor 60 that determines whether or not the electronic watch 50 is worn around the user's wrist. When the sensor determines that the electronic watch 50 is not worn around the user's wrist, the controller 51 sets the electronic watch 50 to the sleep mode. This enables a reduction in the power consumption of the electronic watch 50.

[Effects]

As described above, in the first embodiment, the electronic watch (liquid crystal display) 50 comprises the liquid crystal display unit 10 with the first liquid crystal panel 12 and the second liquid crystal panel 14 laminated therein. The first liquid crystal panel 12 performs the character display including the time display. The second liquid crystal panel 14 performs the information display using a larger amount of information than the character display. Moreover, during the character display, the second liquid crystal panel 14 and backlight 15, which consume a large amount of power, are off.

Therefore, according to the first embodiment, both the character display and the information display can be performed, and the power consumption during the character display can be reduced. Thus, even when the capacity of the power supply such as a primary battery is limited, display time can be drastically increased.

Furthermore, between the first liquid crystal panel 12 and the second liquid crystal panel 14, the air layer 13a is provided in contact with the lower substrate 20 of the first liquid crystal panel 12. Thus, reflected light reflected by the interface between the lower substrate 20 and the air layer 13a can be utilized for display, allowing brighter display to be achieved.

Additionally, when the tilt detecting unit 59 is used to determine that the user is not viewing the liquid crystal screen, the electronic watch 50 is set to the sleep mode. In the sleep mode, the backlight 15, the first liquid crystal panel (PD-LCD or PN-LCD) 12, and the second liquid crystal panel (color LCD) 14 are all off. This enables a reduction in the power consumption of the electronic watch 50.

In addition, the electronic watch 50 comprises the touch panel 11 that can be easily operated by the user. The display mode is switched depending on a touch operation detected by the touch panel 11. Thus, even when the electronic watch 50 has a plurality of display modes, the display modes can be easily switched.

Second Embodiment

Figure 11:
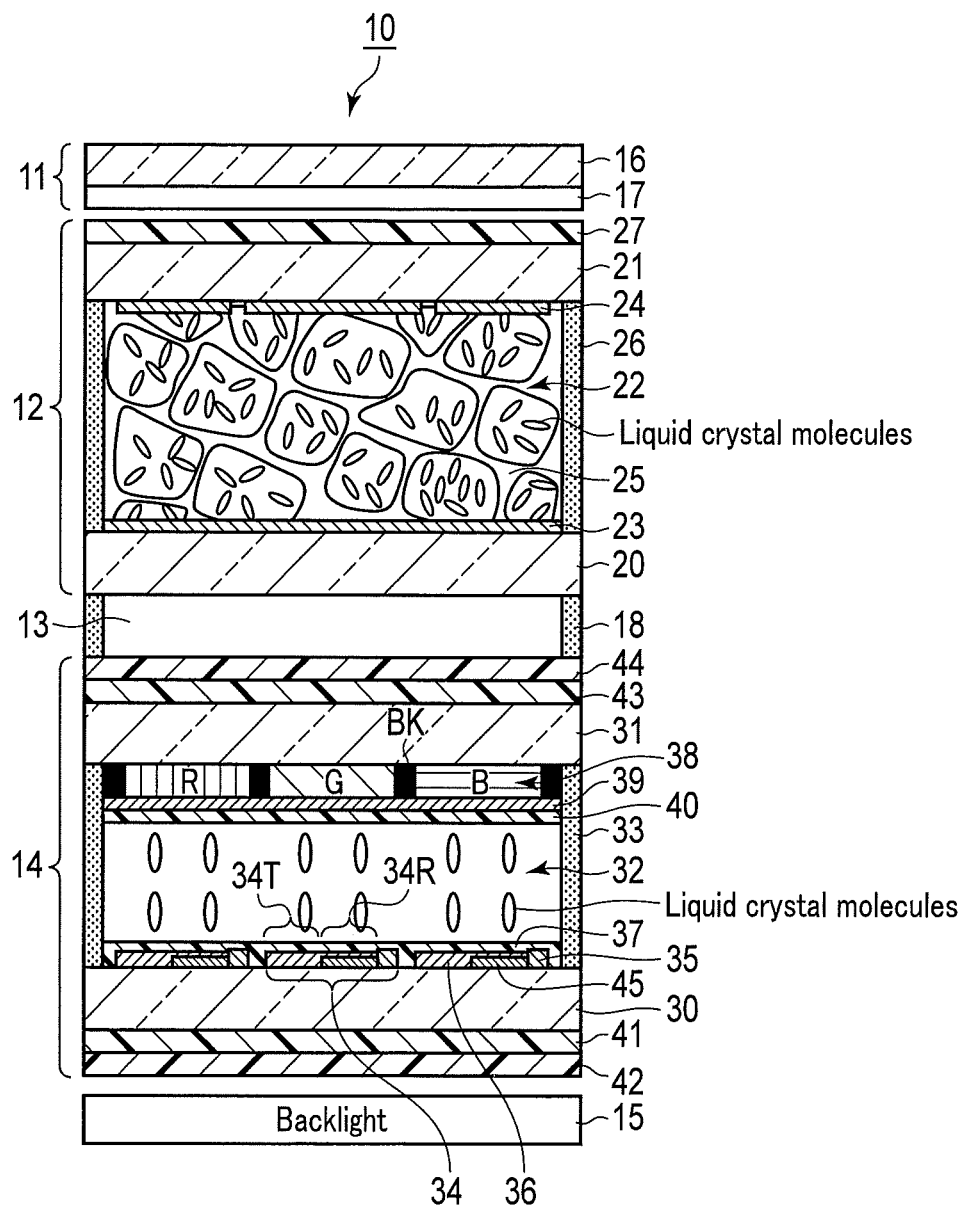
FIG. 11 is a cross-sectional view of the liquid crystal display unit according to a second embodiment.

A second embodiment is a configuration example in which a semi-transmissive liquid crystal panel is used as a second liquid crystal panel 14. FIG. 11 is a cross-sectional view of a liquid crystal display unit 10 according to the second embodiment.

Pixels 34 in the second liquid crystal panel 14 each comprise a reflective area 34R and a transmissive area 34T. The reflective area 34R corresponds to an area of the pixel 34 in which a reflective film 45 is provided. The transmissive area 34T corresponds to an area of the pixel in which the reflective film 45 is not provided.

The reflective film 45 is formed on a TFT substrate 30 and has a function to reflect outside light incident through a display surface of the liquid crystal display unit 10. Aluminum (Al) is used as the reflective film 45. For the remaining part of the configuration, the second embodiment is the same as the first embodiment.

In the liquid crystal display unit 10 configured as described above, when the display on the liquid crystal display unit 10 is viewed in a bright outdoor environment, reflected light from the reflective area 34R of the second liquid crystal panel 14 can be utilized for display. This improves the outdoor visibility of the liquid crystal display unit 10 and allows the information display on the second liquid crystal panel 14 to be made brighter.

In the first and second embodiments, the watch has been illustrated as the electronic equipment. However, the present invention is not limited to this. The liquid crystal display unit 10 with the first liquid crystal panel 12 and the second liquid crystal panel 14 laminated therein may be applied to small, potable shapes such as cellular phones and portable information terminals and other types of electronic equipment such as displays, computers, and cameras which serve as wearable devices carried by the user.

The present invention is not limited to the embodiments described above, and can be embodied by modifying constituent elements without departing from the gist of the invention. In addition, the above embodiments include inventions of various stages, and various inventions can be formed by proper combinations of a plurality of constituent elements disclosed in one embodiment or proper combinations of constituent elements disclosed in different embodiments. When, for example, the problems to be solved by the present invention can be solved and the effects of the invention can be obtained even if several constituent elements are omitted from all the constituent elements disclosed in each embodiment, an embodiment from which these constituent elements are omitted can be extracted as an invention.

What is claimed is:

1. A liquid crystal display comprising:
a first liquid crystal panel comprising
first and second substrates which are disposed opposite each other, and a first liquid crystal layer of a polymer dispersed type or a polymer network type sandwiched between the first and second substrates;
a second liquid crystal panel comprising
third and fourth substrates which are disposed opposite each other,
a second liquid crystal layer sandwiched between the third and fourth substrates,
a color filter provided on the third substrate, and
first and second polarizing plates provided on the third and fourth substrates, respectively;
an air layer sandwiched between the first and second liquid crystal panels and being in contact with the first and second liquid crystal panels;
a seal member surrounding the air layer and being in contact with the first and second liquid crystal panels;
a light source provided to face the second liquid crystal panel and to emit light toward the second liquid crystal panel; and
a controller configured to execute a first display mode and further configured to execute a second display mode, wherein
the first liquid crystal panel directly faces the second liquid panel,
in the first display mode, the controller drives the first liquid crystal panel and turns off the second liquid crystal panel and the light source, and
in the second display mode, the controller sets the first liquid crystal panel to a transmissive state, drives the second liquid crystal panel, and turns on the light source.

2. The liquid crystal display according to claim 1, wherein the second liquid crystal panel is a normally black mode and a vertical alignment (VA) mode.

3. The liquid crystal display according to claim 1, wherein the second liquid crystal panel comprises pixels, and each of the pixels comprises a reflective area and a transmissive area.

4. The liquid crystal display according to claim 1, wherein
the first liquid crystal panel performs character display, and
the second liquid crystal panel performs information display using a larger amount of information than the character display.

5. The liquid crystal display according to claim 1, further comprising:
a touch panel provided on the first liquid crystal panel,
wherein the controller is configured to switch between executing the first display mode and executing the second display mode depending on a touch operation detected by the touch panel.

6. The liquid crystal display according to claim 1, further comprising:
a detecting unit configured to detect a tilt of a display surface,
wherein the controller is configured to control turn-on and -off of the first and second liquid crystal panels depending on a detection result from the detecting unit.

7. The liquid crystal display acceding to claim 1, wherein no optical element is embedded in the air layer.

8. The liquid crystal display according to claim 1, wherein the seal member is in contact with the second substrate and the first polarizing plate.

9. The liquid crystal display according to claim 1, wherein the seal member surrounds a display area of the first liquid crystal panel.

10. The liquid crystal display according to claim 1, wherein the color filter includes a red filter, a green filter, and a blue filter, and the air layer overlays each of the red, green, and blue filters.

11. The liquid crystal display according to claim 1, wherein
the first display mode is a reflective display by external light, and
the second display mode is a transmissive display by illumination light.

12. The liquid crystal display according to claim 1, wherein
the first liquid crystal panel is configured to execute a reflective display by using external light reflected at an interface between the air layer and the first liquid crystal panel, and
the second liquid crystal panel is configured to execute a transmissive display by using illumination light emitted from the light source.

* * * * *

UNITED STATES PATENT AND TRADEMARK OFFICE
CERTIFICATE OF CORRECTION

PATENT NO. : 10,025,150 B2  
APPLICATION NO. : 14/644780  
DATED : July 17, 2018  
INVENTOR(S) : Akira Igarashi Page 1 of 1

It is certified that error appears in the above-identified patent and that said Letters Patent is hereby corrected as shown below:

In the Claims

Column 12, Line 23:
In Claim 7, Line 1, delete "acceding" and insert -- according --, therefore.

Signed and Sealed this
Twenty-seventh Day of November, 2018

Andrei Iancu
*Director of the United States Patent and Trademark Office*